March 4, 1941.  D. J. WALLACE  2,233,657
SCRAPING IMPLEMENT
Filed May 29, 1939
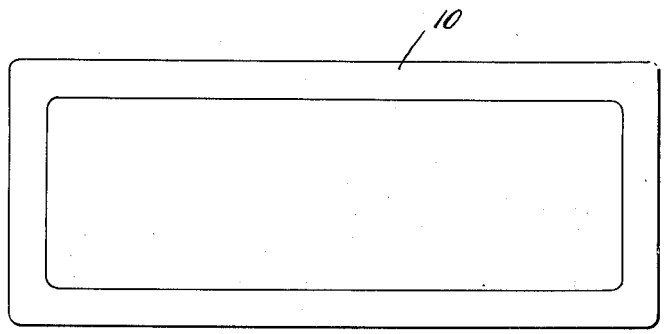
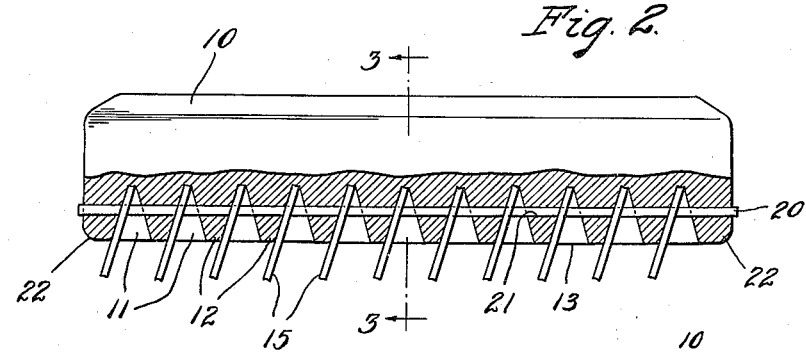
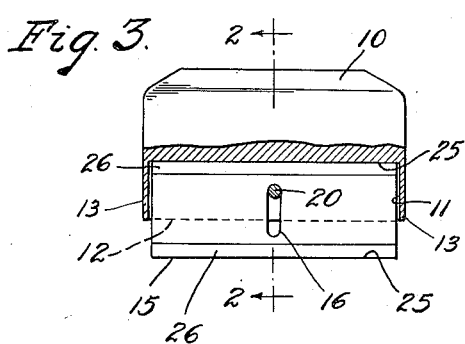 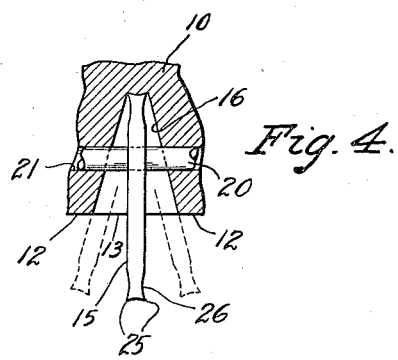
INVENTOR.
David J. Wallace
BY Robt. D. Pearson
ATTORNEY.

Patented Mar. 4, 1941

2,233,657

UNITED STATES PATENT OFFICE 2,233,657

SCRAPING IMPLEMENT

David J. Wallace, Los Angeles, Calif., assignor, by mesne assignments, to J. R. Trottier, Los Angeles County, Calif.

Application May 29, 1939, Serial No. 276,398

11 Claims. (Cl. 30—169)

This invention relates to a scraping implement adapted for performing a great variety of scraping operations.

Among the objects of the invention are to provide a scraper furnished with blades having double scraping edges, the two parts of each double edge being alternately applied to the surface being scraped; to provide an improved means for rockingly supporting scraper blades in such a manner as to apply their scraping edges more efficiently to a surface being scraped; to support the scraper blades in a somewhat yielding manner thereby tempering their scraping action so that they will not cut too deeply into an object being scraped, yet will be efficient in operation and of a sturdy, dependable construction; to provide an improved elastic member as a carrier for the scraping elements, and to simplify and improve upon various structural details of devices of the kind to which the invention pertains.

Other objects, advantages and inventive features of construction will hereinafter appear.

Referring to the accompanying drawing, which illustrates what is at present deemed to be a preferred embodiment of the invention, Fig. 1 is a plan view of the device, looking at the back thereof.

Fig. 2 is a side elevation thereof.

Fig. 3 is a cross section on line 3—3 of Fig. 2.

Fig. 4 is a reproduction on an enlarged scale of a portion of Fig. 2 showing more clearly an individual scraper blade, its attaching means and its relation to adjacent parts of the device. Different operative positions of said blade are indicated by dotted lines.

Referring in detail to the drawing, the elongated, generally rectangular body 10 is of an elastic character, being desirably made of rubber or a rubber-like material. It is furnished with a plurality of transversely extending, substantially parallel grooves 11 which extend into one of its faces, and which are desirably equally spaced apart, as shown. Each of said grooves 11 is of a triangular shape as to its cross-section, thus widening its mouth portion and narrowing its bottom. Hence adjacent grooves 11 are separated by elongated, triangular (in cross section) projections 12 of the body 10. The body 10 has webs 13 along its sides which close the ends of the grooves 11.

Within each groove 11 is rockably mounted a scraper blade 15 which extends to the bottom of the groove and a portion of which projects from the groove, as shown. The portion of the blade contained within the groove is furnished with an aperture 16 which is elongated in the direction of the width of the blade. Through this aperture or slot of each blade 15 extends a tie rod 20, which is common to all blades. Said tie rod 20 passes in a friction tight manner through alined holes 21 through the central portions of the triangular projections 12 of the body 10 which are between the grooves 11, there also being a body projection 22 at each end of the device through which said rod likewise passes in a friction tight manner; or if desired, other suitable securing means may be provided to keep the rod in place.

Said tie rod 20 is made of spring steel and therefore will permit the body 10 to be considerably flexed when the device is in use, thus making it possible to apply the scraper blades more effectively to uneven surfaces.

The slot 16 of each blade 15 is located at its mid-width, hence the blade is rendered reversible so that either of its long edges may be utilized for scraping operations. Each long edge of the blade is furnished with a double cutting edge having the cutting angles 25, scallops 26 near the long sides of the blade serving to increase the cutting efficiency of the edges 25 by giving them sharper angles.

In using the device the operator will apply the projecting portions of the blades 15 to the surface to be scraped and will then reciprocate the device in the direction of its length. This will cause first one then the other of the cutting angles or shoulders 25 of the outer double edge of each blade to scrape the surface of the surface being operated upon. This alternate use of said cutting shoulders results from the rocking movement imparted to each blade, as indicated by dotted lines in Fig. 4, and not only causes them to act more effectively but doubles the period of time they can be used without sharpening. These blades are also reversible, hence first one double edge and then the other can be positioned for application to surfaces to be scraped, the tie rod 20 being removable to permit of the reversing of the blades. After being reversed, the blades will operate in the same manner as before, because the slot 16 of each blade is symmetrically positioned in respect to the length and width of the blade.

The flexibility of the body 10 and resiliency of the tie rod 20 combine to permit a limited flexion of the device as a whole, enabling the operator to conform the scraping edges of the blades more closely to wavy, convex or concave surfaces being scraped.

Owing to the elastic character of the grooved portion of the body 10 and to the taper in cross section of the portions thereof located between the grooves, a yielding action is afforded to each scraper blade which permits it to ride over high spots of surfaces being scraped and also to conform better to uneven surfaces. Also the swinging action of the blades is made more positive and satisfactory by reason of the fact that the inner portions of the grooves 11 are sufficiently narrowed to maintain substantially stationary the inner edges of the blades which abut against them, thus causing the outer edge of each blade to swing in an arc the radius of which is determined by the position of its inner edge.

I claim:

1. In a device of the kind described, an elongated body having a plurality of transverse grooves which open out along a side portion thereof, scraper blades which individually occupy individual grooves of said plurality of grooves, said grooves allowing a rocking movement of said blades, and means to fasten said blades swingably within said grooves, said grooves having narrowed inner portions containing snugly the inner edge portions of said blades.

2. The subject matter of claim 1 and, the portions of said body between said grooves being elastic and tapered to cushion the scraping action of said blades.

3. In a device of the kind described, an elongated body having a plurality of transverse grooves which open out along a side portion thereof, scraper blades which individually occupy individual grooves of said plurality of grooves, said grooves allowing a rocking movement of said blades, said blades having apertures through them, and a tie rod extending through said apertures and secured to said elongated body, said tie rod being of smaller cross sectional dimensions than the openings afforded by said apertures, thereby affording clearances between said blades and rod to allow the aforesaid swinging movement of said blades to take place.

4. In a device of the kind described, an elongated body of elastic material having a plurality of transverse grooves formed in a side portion thereof, scraper blades occupying said grooves, and means to fasten said blades within said grooves, the elasticity of said body allowing a greater flexion of said blades when the latter are used to perform a scraping operation.

5. In a device of the kind described, an elongated body having a plurality of straight parallel grooves in a side portion thereof, said grooves being triangular thereby widening their mouth portions, apertured scraper blades partially contained within said grooves, and a tie rod for said blades which passes loosely through their apertures and is secured to said body, the apertures of said blades being elongated in the direction of the widths of the blades to permit said blades to rock in relation to said rod from abutting against one of the inclined sides of the grooves to abutting their opposite sides.

6. The subject matter of claim 5 and, said body having webs along its sides which cover the ends of said grooves.

7. In a device of the kind described, an elongated body of elastic material having a plurality of transverse grooves formed in a side portion thereof, scraper blades occupying said grooves, and a resilient rod secured to said body and extending through apertures through said blades to fasten them within said grooves, the resiliency of said rod and elasticity of said body allowing a longitudinal flexion of the device whereby the scraping edges of said blades may be conformed to unevenness in the contour of a surface being scraped.

8. In a device of the kind described, a supporting body, and a series of substantially parallel scraper blades rockably attached to a side portion thereof in a projecting relation thereto, there being means carried by said body to maintain substantially stationary the inner portions of said blades, and stop means to limit their rocking movements, said blades having scraping edges at their inner and their outer sides and being reversible to utilize both the inner and the outer of said edges for scraping operations.

9. In a device of the kind described, an elongated body having a plurality of transverse grooves which open out along a side portion thereof, scraper blades which individually occupy individual grooves of said plurality of grooves, said grooves allowing a rocking movement of said blades, and means to fasten said blades swingably within said grooves, said grooves having narrowed inner portions of substantially the same width as each edge portion of said blades.

10. In a device of the kind described, an elongated body having a plurality of transverse grooves which open out along a side portion thereof, said grooves being tapered to a triangular cross-section, thus widening their mouth portions, a scraper blade in each of said grooves and means whereby said blades are loosely attached to said body with either of their scraping edges abuttable against the inner portions of said grooves thereby allowing each blade to rock back and forth to and from contact with opposite sides of the mouth of the groove which it occupies, said attaching means consisting of a rod which extends transversely through a plurality of said blades.

11. In a device of the kind described, an elongated body having a plurality of transverse grooves which open out along a side portion thereof, said grooves being tapered, thus widening their mouth portions, a scraper blade in each of said grooves, and means whereby said blades are loosely attached to said body thereby allowing each blade to rock back and forth to and from contact with opposite sides of the mouth of the groove which it occupies, there being an angular scraping edge along each side of the outer part of each of said blades, the rocking movement of the blade causing the scraping action thereof to be alternately transferred from one to the other of said scraping edges.

DAVID J. WALLACE.